(12) United States Patent
Choi et al.

(10) Patent No.: US 8,588,056 B1
(45) Date of Patent: Nov. 19, 2013

(54) ELIMINATION OF UNWANTED PACKETS ENTERING A RESTRICTED BANDWIDTH NETWORK

(75) Inventors: Heesook Choi, Foster City, CA (US); Kosol Jintaseranee, Sunnyvale, CA (US); Travis Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 584 days.

(21) Appl. No.: 12/424,394

(22) Filed: Apr. 15, 2009

(51) Int. Cl.
*H04L 12/26* (2006.01)

(52) U.S. Cl.
USPC .......................................... 370/216

(58) Field of Classification Search
USPC ......................................... 370/216; 726/1–30
See application file for complete search history.

(56) References Cited

U.S. PATENT DOCUMENTS

| | | | |
|---|---|---|---|
| 2003/0014665 A1* | 1/2003 | Anderson et al. | 713/201 |
| 2005/0111447 A1* | 5/2005 | Soukup | 370/389 |
| 2006/0056391 A1* | 3/2006 | Rana et al. | 370/352 |
| 2006/0098585 A1* | 5/2006 | Singh et al. | 370/252 |
| 2006/0128406 A1* | 6/2006 | Macartney | 455/466 |
| 2007/0030850 A1* | 2/2007 | Grosse | 370/392 |
| 2007/0180031 A1* | 8/2007 | Stern et al. | 709/206 |
| 2008/0062891 A1* | 3/2008 | Van der Merwe et al. | 370/254 |
| 2008/0147808 A1* | 6/2008 | Pang | 709/206 |
| 2008/0168536 A1* | 7/2008 | Rueckwald | 726/4 |
| 2008/0317038 A1* | 12/2008 | Pasko et al. | 370/395.5 |
| 2009/0154348 A1* | 6/2009 | Newman | 370/230 |
| 2009/0300759 A1* | 12/2009 | Wang et al. | 726/22 |
| 2010/0122335 A1* | 5/2010 | Van der Merwe et al. | 726/11 |
| 2010/0124223 A1* | 5/2010 | Gibbs et al. | 370/389 |
| 2010/0138539 A1* | 6/2010 | Neville et al. | 709/226 |
| 2010/0191850 A1* | 7/2010 | Tonnesen | 709/224 |
| 2012/0063456 A1* | 3/2012 | Fernandez Gutierrez | 370/390 |

* cited by examiner

*Primary Examiner* — Mark Rinehart
*Assistant Examiner* — Christopher R Crompton (57) ABSTRACT

Systems, methods, and computer-readable media for eliminating unwanted data packets by a restricted bandwidth network that interfaces with a second network are provided. In embodiments, a device receives unwanted data packets associated with identification of the device. Due to the transient nature of some forms of device identification, data packets intended for one user may be received by another user who has taken on the device identification of the first user. To remedy this situation, unwanted data packets are identified and blocked at a gateway based on the source and/or destination identification associated with the data packets.

21 Claims, 8 Drawing Sheets

ELIMINATION OF UNWANTED PACKETS ENTERING A RESTRICTED BANDWIDTH NETWORK

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

In a first aspect, a method is provided for eliminating unwanted data packets addressed for routing to a device on a restricted bandwidth network that interfaces with a second network. In embodiments, the restricted bandwidth network may comprise, for example, a wireless network, a mobile network, or a cable network where bandwidth may become restricted as more users join onto the cable network. The unwanted data packets originate from the second network and cause error messages to be generated by recipients of the unwanted data packets in the restricted bandwidth network. In alternative embodiments, the device may be on the same restricted bandwidth network from which the unwanted data packets originate. In the method, error messages are received at a gateway connecting the restricted bandwidth network to the second network. In embodiments, the gateway may comprise a routing device, such as a home agent. The error messages are received from devices on the restricted bandwidth network in response to the receipt of unwanted data packets by the devices. Error messages may include the destination of the unwanted data packet, the source of the unwanted data packet, the origin of the device sending the error message as the source of the error message, and the target of the error message as the destination of the error message. The error messages, including the origin and target information, are monitored at a gateway. The error messages continue to be monitored until a determination is made that a defined threshold number of error messages with a unique origin and target identification have been received at the gateway within a predetermined amount of time. Once the threshold number of error messages with the unique origin and target identification have been received, a first access control list is created to recognize data packets that include source and destination information that matches the origin and target identification from the error messages that met the defined threshold number of error messages within the predetermined amount of time. Thereafter, the data packets having source and destination identification listed on the first access control list are blocked at the gateway. Once a predetermined condition has occurred, the first access control list is eliminated.

In a second aspect, a method is provided for eliminating unwanted data packets received by a restricted bandwidth network that interfaces with a second network. The unwanted data packets originate from the second network and cause error messages to be generated by recipients of the unwanted data packets in the restricted bandwidth network. In embodiments, the device may be on the same restricted bandwidth network from which the unwanted data packets originate. In the method, error messages are received at a gateway connecting the restricted bandwidth network to the second network. In embodiments, the gateway may comprise a routing device, such as a home agent. The error messages are received from devices on the restricted bandwidth network in response to the receipt of unwanted data packets by the devices. Error messages may include the destination of the unwanted data packet, the source of the unwanted data packet, the origin of the device sending the error message as the source of the error message, and the target of the error message as the destination of the error message. The error messages, including the origin and target information, are monitored at a gateway. The error messages continue to be monitored until a determination is made that a defined threshold number of error messages with a unique origin and target identification have been received at the gateway within a predetermined amount of time. Once the threshold number of error messages with the unique origin and target identification have been received, a first access control list is created to recognize data packets that include source and destination information that matches the origin and target identification from the error messages that met the defined threshold number of error messages within the predetermined amount of time. Thereafter, the data packets having source and destination identification list on the first access control list are blocked at the gateway. Once a predetermined condition has occurred, the first access control list is eliminated. At or after the first access control list has been created, a second access control list is also generated based on a second pair of origin and target information associated with error messages received at a gateway. The second access control list is based on the identification information of data packets having a source and destination matching the target and origin, respectively, of the error messages identified on the access control list are blocked. By blocking the data packets, the gateway prevents the device from receiving unwanted data packets. The second access control listed is eliminated after a predetermined condition has occurred.

In a third aspect, a method is provided for eliminating unwanted data packets received by a restricted bandwidth network that interfaces with a second network. The unwanted data packets originate from the second network and cause error messages to be generated by recipients of the unwanted data packets in the restricted bandwidth network. In embodiments, the device may be on the same restricted bandwidth network from which the unwanted data packets originate. In the method, error messages are received at a gateway connecting the restricted bandwidth network to the second network. In embodiments, the gateway may comprise a routing device, such as a home agent. The error messages are received from devices on the restricted bandwidth network in response to the receipt of unwanted data packets by the devices. Error messages may include the destination of the unwanted data packet, the source of the unwanted data packet, the origin of the device sending the error message as the source of the error message, and the target of the error message as the destination of the error message. The error messages, including the origin and target information, are monitored at a gateway. The error messages continue to be monitored until a determination is made that a defined threshold number of error messages with a unique target identification have been received at the gateway within a predetermined amount of time. Once the threshold number of error messages with the unique target identification have been received, a first access control list is created to recognize data packets that include source information that matches the target identification from the error messages that met the defined threshold number of error messages within the predetermined amount of time. Thereafter, the data packets having source identification listed on the first access control list are blocked at the gateway. Once a predetermined condition has occurred, the first access control list is eliminated.

In a fourth aspect, a method is provided for eliminating unwanted data packets received by a restricted bandwidth network that interfaces with a second network. The unwanted data packets originate from the second network and cause error messages to be generated by recipients of the unwanted data packets in the restricted bandwidth network. In embodiments, the device may be on the same restricted bandwidth network from which the unwanted data packets originate. In the method, error messages are received at a gateway connecting the restricted bandwidth network to the second network. In embodiments, the gateway may comprise a routing device, such as a home agent. The error messages are received from devices on the restricted bandwidth network in response to the receipt of unwanted data packets by the devices. Error messages may include the destination of the unwanted data packet, the source of the unwanted data packet, the origin of the device sending the error message as the source of the error message, and the target of the error message as the destination of the error message. The error messages, including the origin and target information, are monitored at a gateway. The error messages continue to be monitored until a determination is made that a defined threshold number of error messages with a unique origin identification have been received at the gateway within a predetermined amount of time. Once the threshold number of error messages with the unique origin identification have been received, a first access control list is created to recognize data packets that include destination information that matches the origin identification from the error messages that met the defined threshold number of error messages within the predetermined amount of time. Thereafter, the data packets having destination identification listed on the first access control list are blocked at the gateway. Once a predetermined condition has occurred, the first access control list is eliminated.

In a fifth aspect, a system is provided for eliminating unwanted data packets received by a restricted bandwidth network that interfaces with second network. The unwanted data packets are received at a device. The computerized system may include a processor and one or more computer-storage media. The system may comprise a gateway device connected to a restricted bandwidth network and a second network. In embodiments, the gateway may comprise a routing device, such as a home agent. The system may also comprise an agent at a gateway to monitor error messages received from a device, wherein the error messages include a source and a destination of the unwanted data packets. The system may also comprise an agent at a gateway to create an access control list for blocking unwanted data packets from being transmitted to the device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| ACL | Access Control List |
| CD-ROM | Compact Disk Read Only Memory |
| DHCP | Dynamic Host Configuration Protocol |
| DVD | Digital Versatile Discs |
| EEPROM | Electrically Erasable Programmable Read Only Memory |
| ICMP | Internet Control Message Protocol |
| IP | Internet Protocol |
| IPS | Intrusion Prevention System |
| MP3 | MPEG-1 Audio Layer 3 |
| MIP | Mobile Internet Protocol |
| PC | Personal Computer |
| PDA | Personal Digital Assistant |
| RAM | Random Access Memory |

| | |
|---|---|
| ROM | Read Only Memory |
| TCP/IP | Internet Protocol Suite |
| TCP RST | Transmission Control Protocol Reset |
| WAP | Wireless Application Protocol |
| URL | Uniform Resource Locator |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for eliminating unwanted data packets by a restricted bandwidth network interfaces with a second network. Embodiments of the invention eliminate unwanted data packets by blocking unwanted data packets at a gateway through the use of an access control list. While embodiments of this invention discussed herein disclose methods for the elimination of unwanted data packets to devices on a restricted bandwidth network, the methods used may also be applied to the elimination of unwanted data packets transmitted over other networks. As such, one purpose of the invention is to improve user experience with a device (such as a mobile device or a television or a computing device, etc.) that receives data packets.

Data packets may refer to blocks of data sent by a modem or computer over a network. The protocol used to send packets may determine the size of the data packets. For example, a data packet sent using Asynchronous Transfer Mode comprises 53 bytes, whereas a data packet sent using TCP/IP may comprise around 1,500 characters. Data packets may comprise information such as: source and destination information, wherein source and destination information may be referred to as "identification information" and may be included in a header; the data that is the subject of the data packet in a packet payload; and stop/start information for executing the delivery of the data. In response to the request from a user device, a server associated with the website may transmit the information. For example, a user may request a video from a website. In response, the website may direct an associated server to use data packets addressed to the user containing the video information. The data packets may comprise data packet identification information, wherein a source address may identify the server associated with the website and a destination address may identify the user device. The identification information may then be used to route the packets from the source to the destination.

Unwanted data packets may refer to data packets that are addressed to a user device that has not requested or no longer wants or expects the data packets. Unwanted data packets may be sent to a user device when an identification associated with the user device becomes appropriated to another device. For example, a user device may receive unwanted data packets after the user device has acquired a device address that was previously assigned to another user device. For example, prior to the user device acquiring the device address, the device address may have been assigned to another user device that legitimately requested data packets to be sent to the device address of the former user device. For example, the prior user device previously assigned the device address may have requested streaming video from a website. In response, a server associated with the website may have begun transmitting data packets towards the device address of the user device. In embodiments, a device address may comprise a mobile IP (MIP) address; a simple IP address, such as those used with cable modem networks that may utilize DHCP in order to assign addresses; or a static IP address, e.g., a hard-coded IP address. While an MIP address and a simple IP address may change across one or more user devices, a static IP address is associated only with a given user device. The change of a MIP address or simple IP address across one or more user device may be called an IP releasing event.

A common source of unwanted data packets occurs when a user device requests the cessation of streaming data packets, or when a user device leaves a device address. When either of these events occurs, a user device may send a request to the server to stop transmitting the data packets. However, servers may simply ignore the requests to stop sending the data packets. This may be due to the fact that some servers find that ignoring cessation requests is more cost-effective than reviewing the cessation requests and taking the effort to stop the streaming data packets. As a result, user devices that once legitimately requested streaming data packets, such as streaming video, may find that they are unable to have the data packets eliminated from their bandwidth.

Another source of unwanted data packets may be a peer-to-peer network that utilizes a user device as a mechanism for transferring data. In this situation, a peer-to-peer may route a significant amount of traffic associated with the peer-to-peer network through a destination associated with the user device. In the process of the peer-to-peer routing this information, a great amount of bandwidth may be used and "charged" to the account of the user device associated with the target device address.

Alternatively, a user device that acquires a device address may find that it receives unwanted data packets that the user device never requested. These unwanted data packets may hinder performance of a user device by requiring the user device to stay "active" in order to generate and send error messages, such as ICMP Type 3 messages or TCP/RST messages. In embodiments, an ICMP Type 3 message may comprise an ICMP Port Unreachable message. Keeping a user device active may drain the battery of the user device and may also take up a great amount of the bandwidth available to the user device, thus potentially hindering a customer's experience with the user device. Additionally, billing issues may arise when a user is charged for bandwidth associated with unwanted data packets.

Embodiments of the present invention disclose systems and methods for eliminating unwanted data packets from entering a wireless network by generating an access control list at a gateway between the server generating the data packets and the device receiving the data packets. In embodiments, the gateway may comprise a routing device and/or a bridging device, such as a home agent, foreign agent, Firewall, or Intrusion Prevention System (IPS). While a gateway may be placed at any point between a server and a user device, the gateway would preferably be located at a home agent. For reasons explained below, it is advantageous for the gateway to be at a location that is able to understand MIP. It is also helpful for the gateway to be located at the home agent for use with a wireless network because the home agent has access to information related to the registration of the device assigned a device address that may be an MIP. Finally, a home agent is an advantageous location for a gateway because it is located closer to the server than, say, a wireless tower. Due to the costs associated with placing a gateway close to a wireless tower, it is preferential to have a gateway closer to a server rather than farther away from the server. In addition to a home agent being a preferential location for the gateway, a foreign agent would also be a good location for the gateway. Like a home agent, a foreign agent would be able to interpret MIP and would be fairly close to the server relative to the wireless tower.

Data packets received at the gateway may be monitored based on identification information in the data packets. In embodiments of the invention, an agent at a gateway may monitor all incoming data packets received to determine whether the data packets contain identification information listed on an access control list. In alternative embodiments, the gateway may only monitor data packets originating when an access control list is in place.

Figure 1:
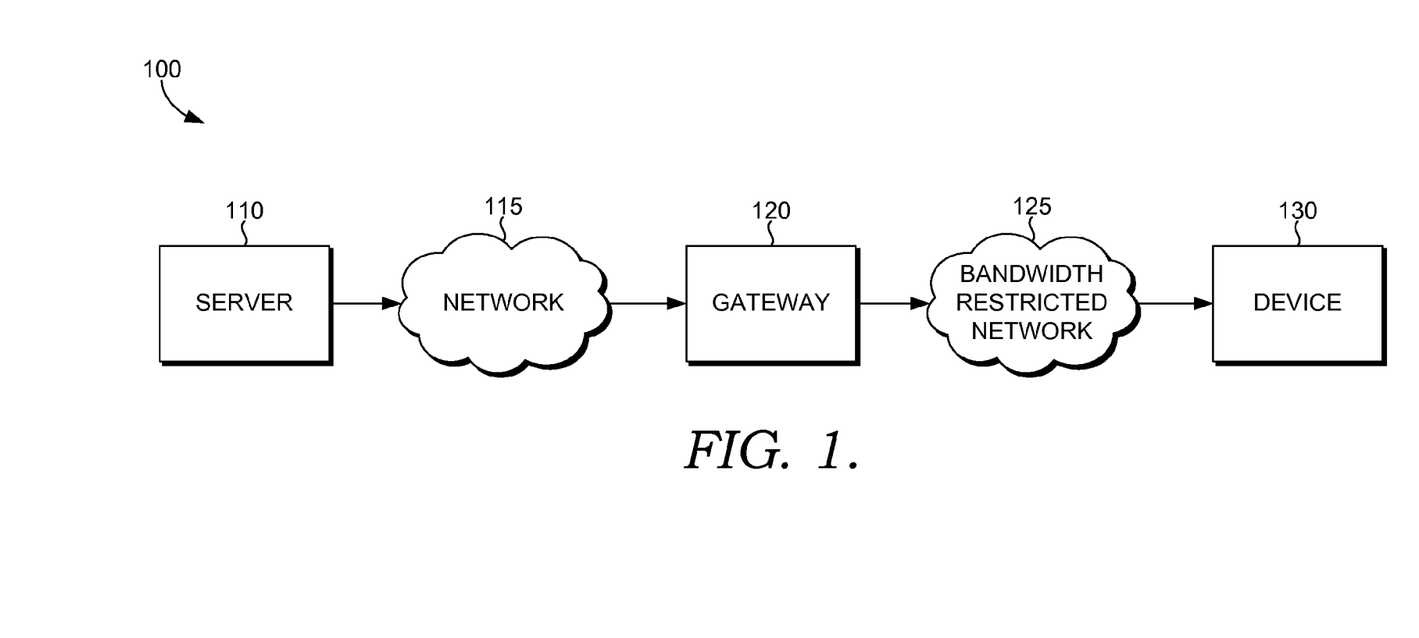
FIG. 1 is a block diagram of an exemplary system for implementing embodiments of the present invention.

Referring now to FIG. 1, a block diagram 100 of an exemplary system for implementing embodiments of the present invention is provided. A server 110 generates data packets addressed to device 130 that are sent over a network 115 and received a gateway 120. The network 115 may comprise routers and/or switches that are used to route data packets through the use of identification information included in the data packets. The gateway sends the packet over a bandwidth restricted network 125 to a device 130.

Network 115 and/or bandwidth restricted network 125 could be wired, wireless, or both. Networks 115 and 125 can include multiple networks, as well as being a network of networks, but is shown in more simple form so as to not obscure other aspects of the present invention. For example, networks 115 and 125 may include one or more wide area networks (WANs), one or more local area networks (LANs), one or more public networks, such as the Internet, and/or one or more private networks. Networks 115 and/or 125 might include an array of devices, which are not shown so as to not obscure more relevant aspects of the invention. In a wireless telecommunications network, components such as a base station, a communications tower, or even access points (as well as other components) can provide wireless connectivity in some embodiments. By way of example only, network 125 might include a wireless telecommunications network while network 115 includes the Internet. Although single components are illustrated for clarity, one skilled in the art will appreciate that networks 115 and/or 125 can enable communication between any number of devices 130. In embodiments, device 130 may utilize wireless application protocol (WAP) to enable Internet access from a mobile phone.

The device 130 can be any computing device that is capable of exchanging data packets. That is, a device 130 might be any computing device that can request, receive, and present web-based content. As such, the device 130 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, the user device 130 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

The device 130 generates and/or communicates error messages. In embodiments, the device 130 communicates error messages to the gateway 120 via network 125. An error message refers to a response (e.g., a data packet) that requests or indicates a desire for unwanted web-based content, such as a particular website, a webpage, a script, etc., to cease. An error message may comprise identification information, wherein identification information may indicate source or destination information as to where a data packet is directed, such as, for example, a domain name, an IP address, or the like. Such identification information might be included within or be a portion of a URL within the content request. One skilled in the art will appreciate that a error message might include a variety of information, some of which will be discussed more fully below.

Figure 2:
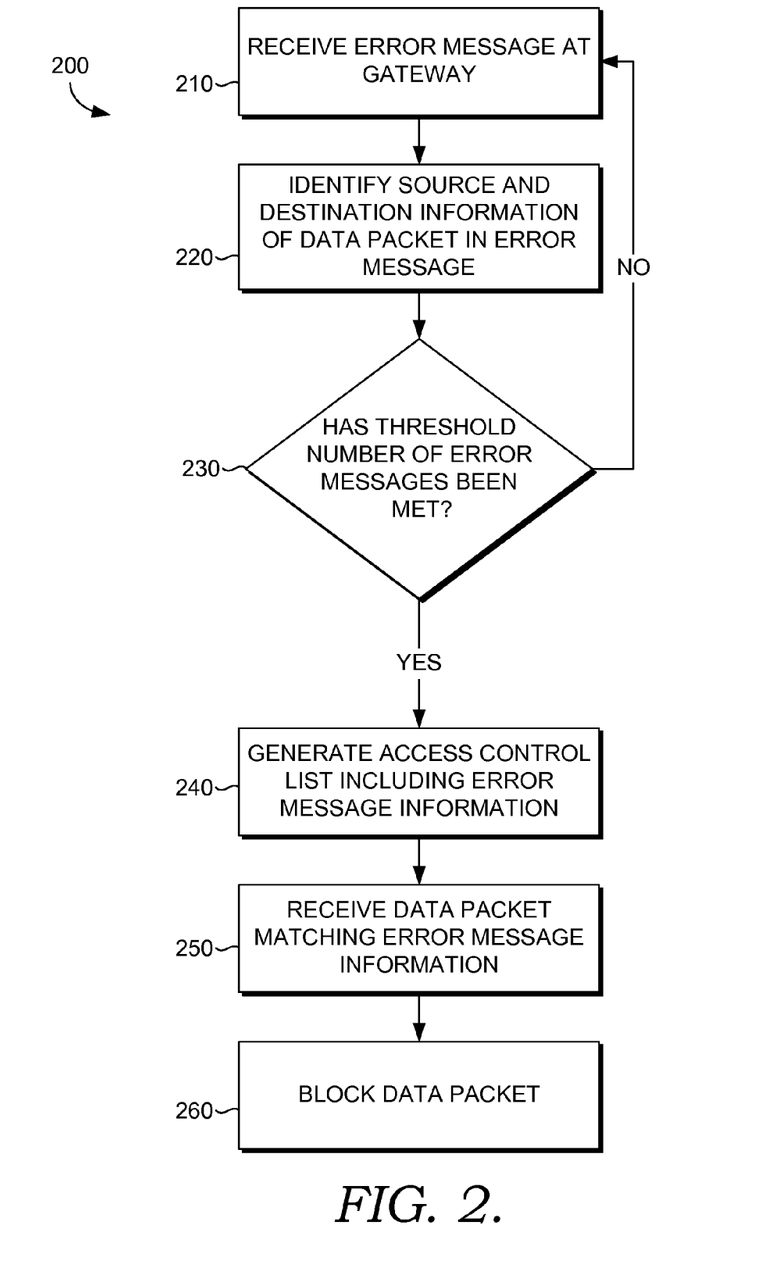
FIG. 2 illustrates a flow diagram of a method for eliminating unwanted data packets before entering a restricted bandwidth network in accordance with an embodiment of the present invention.

FIG. 2 illustrates a flow diagram 200 of a method for eliminating unwanted data packets before entering a restricted bandwidth network in accordance with an embodiment of the present invention. At block 210, an error message is received at a gateway. The error message is sent in response to receiving an unwanted data packet(s) at a user device, and the error message may include part or all of the unwanted data packet(s) received at the user device. At block 220, the origin and target information of the error messages is identified at the gateway. At block 230, a determination is made whether the number of error messages with the unique identification information has met a threshold number of error messages within a predetermined amount of time. For example, an access control list may be generated when a gateway receives more than three error messages including identification information comprising the same source and destination of unwanted data packets within a one minute period. Alternatively, an access control may be generated if more than five error messages are received from five distinct origins and a single destination within a one minute period, wherein the error messages include identification information comprising a source of unwanted data packets.

If the error message does not meet the threshold number within a predetermined amount of time, the gateway waits to receive another error message as seen at block 210. Alternatively, if the error message meets the threshold number, at block 240 the gateway generates an access control list based on the identification information of the error messages. At block 250, a data packet is received at the gateway, wherein the data packet includes identification information matching the error message identification information previously received at the gateway and listed on an access control list. At block 260, the data packet is blocked at the gateway. In alternative embodiments, an origin of error messages that is associated with more than a threshold number of access control lists may have the associated session terminated. For example, if a device address is the origin of more than ten access control lists at a gateway, the session comprising that device address may be terminated and the user device may be required to register under another device address.

Figure 3:
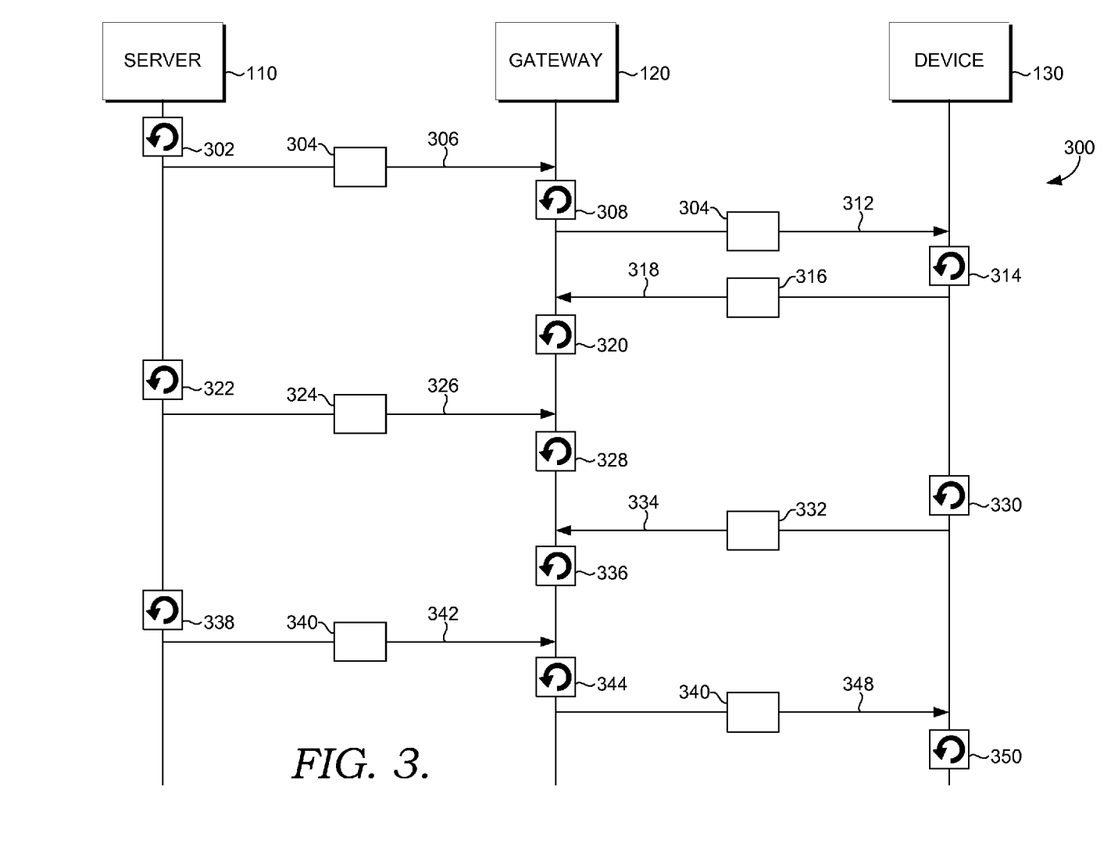
FIG. 3 illustrates a flow diagram of a method for eliminating unwanted data packets before entering a restricted bandwidth network in accordance with an embodiment of the present invention.

FIG. 3 illustrates a flow diagram 300 of a method for eliminating unwanted data packets before entering a restricted bandwidth network in accordance with an embodiment of the present invention. Initially, as indicated at step 302, a first data packet 304 is generated at a server 110. The first data packet 304 is then sent 306 over a network and received at a gateway 120. The first data packet 304 is received at the gateway 120 at step 308. Still at step 308, the identification information of the first data packet 304 is recognized and, at step 312, sends the first data packet 304 to a device 130. At the device 130, the first data packet 304 is recognized as being unwanted, meaning the device 130 did not request the first data packet 304 to be delivered to the device 130. At step 314, the device 130 generates an error message 316. The error message 316 may comprise, as an example only, an ICMP Type 3 messages message or a TCP RST message. The error message 316 includes the unwanted data packet(s) received at the device 130.

The error message 316 is sent 318 over a network where it is received 320 at the gateway 120. Still at step 320, the origin and target of the error message 316 are monitored at the gateway 120. The origin and target of the error message 316 may be monitored by an agent at the gateway 120. In these embodiments, the source and destination of the first data packet 304 comprising the error message 316 may be monitored at the gateway 120. The source and destination of the first data packet 304 may be monitored by an agent at the gateway 120.

Still at the gateway 120, the number of error messages received at the gateway 120 may be tracked to determine whether a threshold number of error messages with specific identification information have been received at the gateway 120 within a predetermined amount of time, such as a predetermined amount of time prior to the receipt of the most recent error message 316. As mentioned above, the specific identification of the error message 316 may comprise at least one of the origin of the error message; the target of the error message; the source of the data packet; or the destination of the data packet. In alternative embodiments, the number of error messages sent by a device 130 may be tracked by the device 130, and the information of how many error messages have been sent and when the error messages have been sent may be included in the error message 316 from the device 130. Alternatively, the device 130 may make the determination as to whether a threshold number of error messages have been sent by the device 130 within a certain amount of time, and the device 130 may include this information in the error message 316.

Still at step 320, the gateway 120 recognizes the error message 316 from the device 130 as meeting the threshold number of error messages with a particular identification within a predetermined amount of time. As such, still at step 320, a first access control list is generated at the gateway 120, wherein the first access control list is used to recognize incoming data packets with the particular identification associated with the error messages. The first access control list may be generated by an agent at the gateway 120.

At 322, a second data packet 324 is generated by the server 110. At step 326, the second data packet 324 is sent to the gateway 120. At step 328, an agent at the gateway 120 recognizes the second data packet 324 as comprising identification information that is listed on the first access control list. Consequently, still at step 328, the data packet 324 is blocked from being delivered to the device 130.

At step 330, a predetermined condition occurs at the device 130. For example, a Mobile IP address may be changed at the device 130. Still at step 330, a notification 332 is generated by the device 130 and is sent 334 to the gateway 120. At step 336, the gateway receives the notification of the predetermined condition. In alternative embodiments, a predetermined condition may occur and be recognized at the gateway. For instance, if the predetermined condition states that a predetermined amount of time must pass without receiving any unwanted data packets that comprise identification information included on an access control list, then that condition may occur and be recognized at the gateway.

Still at step 336, the gateway 120 eliminates the first access control list in response to the occurrence of the predetermined condition. A predetermined condition may comprise the expiration of a time limit (e.g., five minutes), the expiration of a time limit after the gateway has ceased to receive any data packets with a particular source and destination identification, or the expiration of a device address registration for a user device. Note, for the last embodiment, the gateway would preferably be placed at either a home agent or a foreign agent due to the ability of a home agent and a foreign agent to interpret MIP. Between the choice of a home agent and a foreign agent, a home agent would be a preferable choice in the latter example given the access a home agent has to MIP registration information.

At step 338, the server 110 generates a third data packet 340. The third data packet 340 contains the same identification information as the first data packet 304 and the second data packet 324. The third data packet 340 is sent 342 to the gateway 120. At the gateway 120, the third data packet 340 is received at step 344. At step 348, the third data packet 340 is sent 348 to the device 130 where it is received by the device 130 at step 350.

Figure 4:
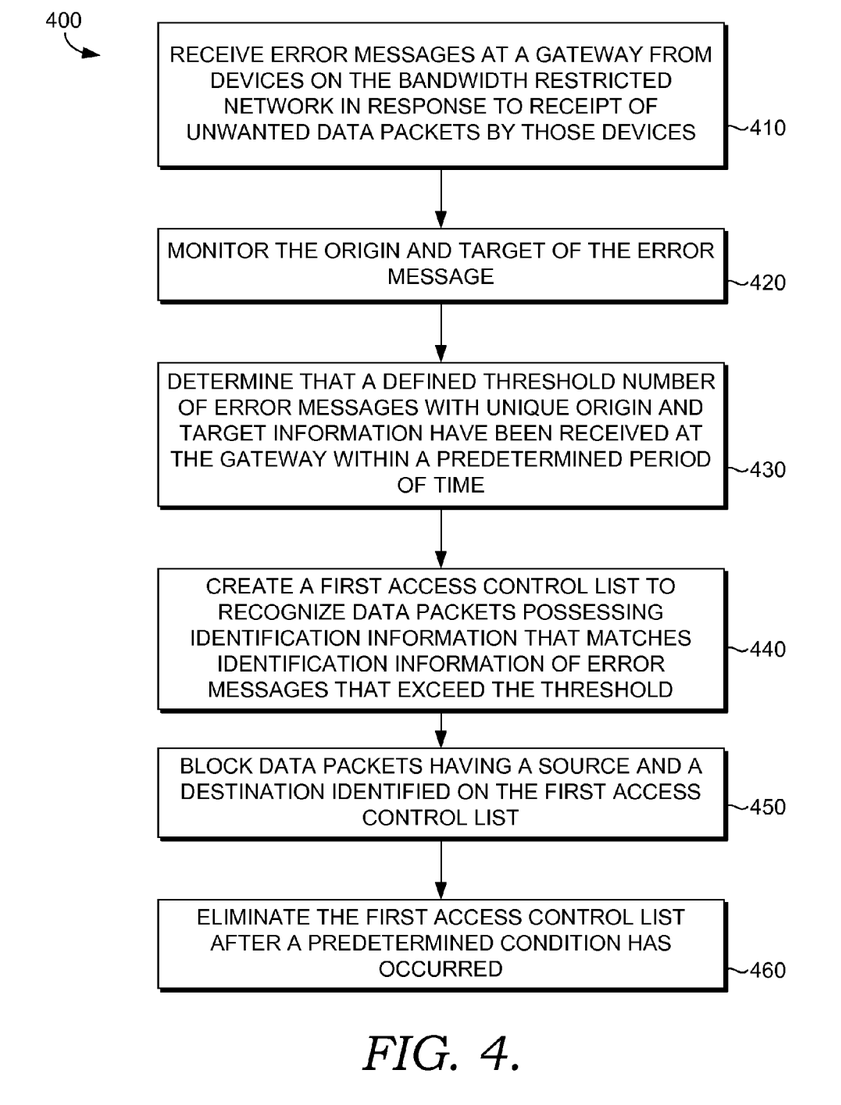
FIG. 4 illustrates a flow diagram of a method for eliminating unwanted data packets before entering a restricted bandwidth network through the use of an access control list, the access control list identifying unwanted data packets based on an unique source and destination of the data packets in accordance with an embodiment of the present invention.

FIG. 4 illustrates a flow diagram 400 of a method for eliminating unwanted data packets before entering a restricted bandwidth network through the use of an access control list, the access control list identifying unwanted data packets based on a unique source and destination of the data packets in accordance with an embodiment of the present invention. This embodiment of the invention may be used to eliminate unwanted data packets from being delivered to a user device, the unwanted data packets originating from an offending source, such as an offending server. An offending server may comprise a server that fails to cease the streaming of data packets to a device address even after a request has been received at the server for the service data packets to that device address to be stopped.

Initially, as indicated at block 410, error messages are received at a gateway from devices on the restricted bandwidth network in response to receipt of unwanted data packets by those devices. The gateway connects the restricted bandwidth network to a second network from which the unwanted data packets originate. Each error message may include the destination of the unwanted data packet, the source of the unwanted data packet, the origin of the device sending the error message as the source of the error message, and the target of the error message as the destination of the error message.

Thereafter, at block 420, the origin and target of the error message is monitored at the gateway. Also at step 420, the number of error messages with a unique origin and target that have been received at the gateway within a predetermined amount of time are also monitored. To block unwanted data packets with the unique origin and destination identification from reaching the device, at block 430 a first access control list is created to recognize data packets that include identification information matching the identification information of the error messages that met the defined threshold number of error messages within the predetermined amount of time. If and when data packets possess source and destination information identified on the first access control list pass through the gateway, said data packets will be blocked at the gateway as indicated at block 440. At block 450, the first access control list is eliminated after a predetermined condition has occurred.

Figure 5:
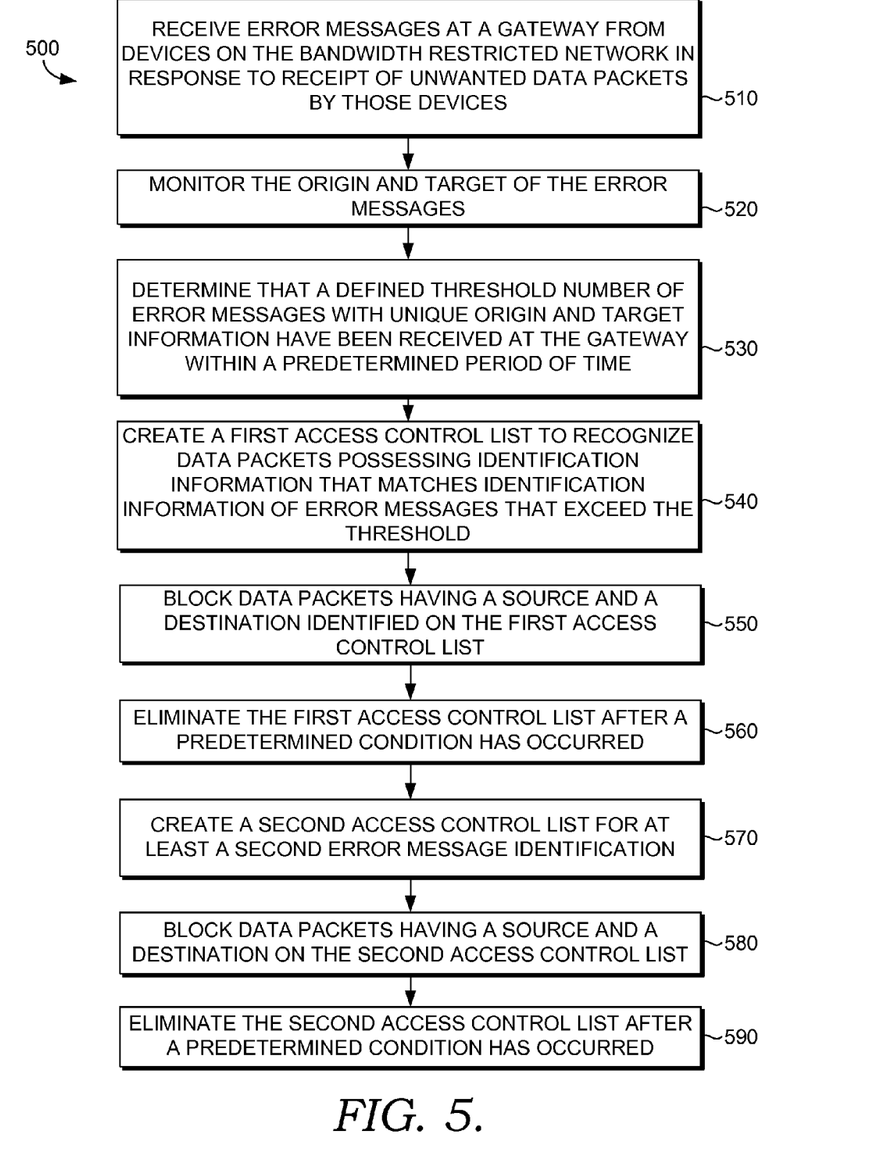
FIG. 5 illustrates a flow diagram of a method for eliminating unwanted data packets before entering a restricted bandwidth network through the use of a plurality of access control lists, the access control lists identifying unwanted data packets based on a plurality of unique source and destination associations of the data packets in accordance with an embodiment of the present invention.

FIG. 5 illustrates a flow diagram 500 of a method for eliminating unwanted data packets before entering a restricted bandwidth network through the use of a plurality of access control lists, the access control lists identifying unwanted data packets based on a plurality of unique source and destination associations of the data packets in accordance with an embodiment of the present invention. This embodiment of the invention may be used to eliminate unwanted data packets received from a plurality of devices and originating form a plurality of sources.

At block 510, error messages are received at a gateway from a plurality of devices. The error messages are sent by the plurality of devices on a restricted bandwidth network, the error messages sent in response to receipt of unwanted data packets by the plurality of devices. The gateway connects the restricted bandwidth network to the plurality of devices. Once the error messages are received at the gateway, at block 520 the origin and target of the error messages are monitored. The origin of the error messages identifies the device sending the error message in response to receiving unwanted data packets. The target of the error messages identifies the source of the unwanted data packets, e.g. a server.

Next, at block 530, the monitored error messages are tracked to determine whether the number of error messages associated with a specific origin and target have reached a threshold number within a predetermined amount of time. If it is determined at step 530 that a threshold number of error messages has been met, a first access control list is created at block 540 to recognize data packets comprising a source matching the target of the error messages exceeding the threshold amount in a predetermined amount of time and, further, the data packets comprising a destination matching the origin of the error messages exceeding the threshold amount in a predetermined amount of time. At block 550, data packets having a source and destination matching the target and origin, respectively, of the error messages identified on the access control list are blocked. By blocking the data packets, the gateway prevents the device from receiving unwanted data packets. At block 560, the first access control list is eliminated after a predetermined condition has occurred.

At block 570, a second access control list is generated based on a second pair of origin and target pairs associated with error messages received at a gateway. At block 580, data packets having a source and destination matching the target and origin, respectively, of the error messages identified on the access control list are blocked. By blocking the data packets, the gateway prevents the device from receiving unwanted data packets. Finally, at block 590, the second access control list is eliminated after a predetermined condition has occurred. In alternative embodiments, the predetermined condition that is the cause of the elimination of the second access control list may be the same or different than the predetermined condition that is the cause of the elimination of the first access control list.

Figure 6:
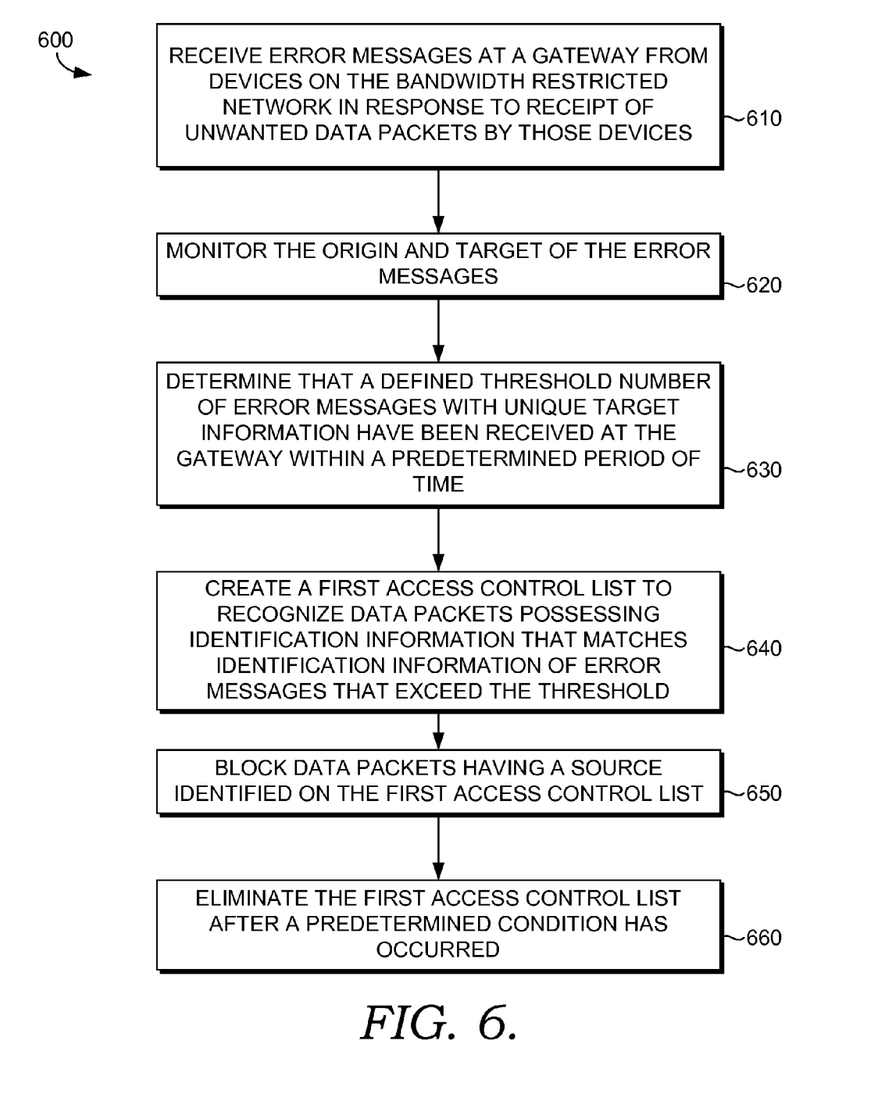
FIG. 6 illustrates a flow diagram of a method for eliminating unwanted data packets before entering a restricted bandwidth network through the use of an access control list, the access control list identifying unwanted data packets based on an unique source of the data packets in accordance with an embodiment of the present invention.

FIG. 6 illustrates a flow diagram 600 of a method for eliminating unwanted data packets before entering a restricted bandwidth network through the use of an access control list, the access control list identifying unwanted data packets based on a unique source of the data packets in accordance with an embodiment of the present invention. This embodiment of the invention may be used to prevent an offending server from streaming unwanted data packets from the offending server to a plurality of devices on a restricted bandwidth network. In embodiments, if a sufficient number of users on a restricted bandwidth network send error messages to a gateway requesting the cessation of data from an offending server, the gateway may create an access control list that blocks all data packets from that server, as identified by the target of the error messages and/or the source of the unwanted data packets.

Initially, at block 610, error messages are received at a gateway from a plurality of devices. The error messages are sent by the plurality of devices on a restricted bandwidth network, the error messages sent in response to receipt of unwanted data packets by the plurality of devices. The gateway connects the restricted bandwidth network to the plurality of devices. Once the error messages are received at the gateway, at block 620 the origin and target of the error messages are monitored. The origin of the error messages identifies the device sending the error message in response to receiving unwanted data packets. The target of the error messages identifies the source of the unwanted data packets, e.g. a server.

Next, at block 630, the monitored error messages are tracked to determine whether the number of error messages associated with a specific origin have reached a threshold number of error messages within a predetermined amount of time. If it is determined at step 630 that a threshold number of error messages has been met, a first access control list is created at block 640 to recognize data packets comprising a source matching the target of the error messages exceeding the threshold amount of error messages in a predetermined amount of time and, further, the data packets comprising a destination matching the origin of the error messages exceeding the threshold amount of error messages in a predetermined amount of time. At block 650, data packets having a source matching the target of the error messages identified on the access control list are prevented from entering a restricted bandwidth network. By blocking the data packets, the gateway prevents the device from receiving unwanted data packets. At block 660, the first access control list is eliminated after a predetermined condition has occurred.

Figure 7:
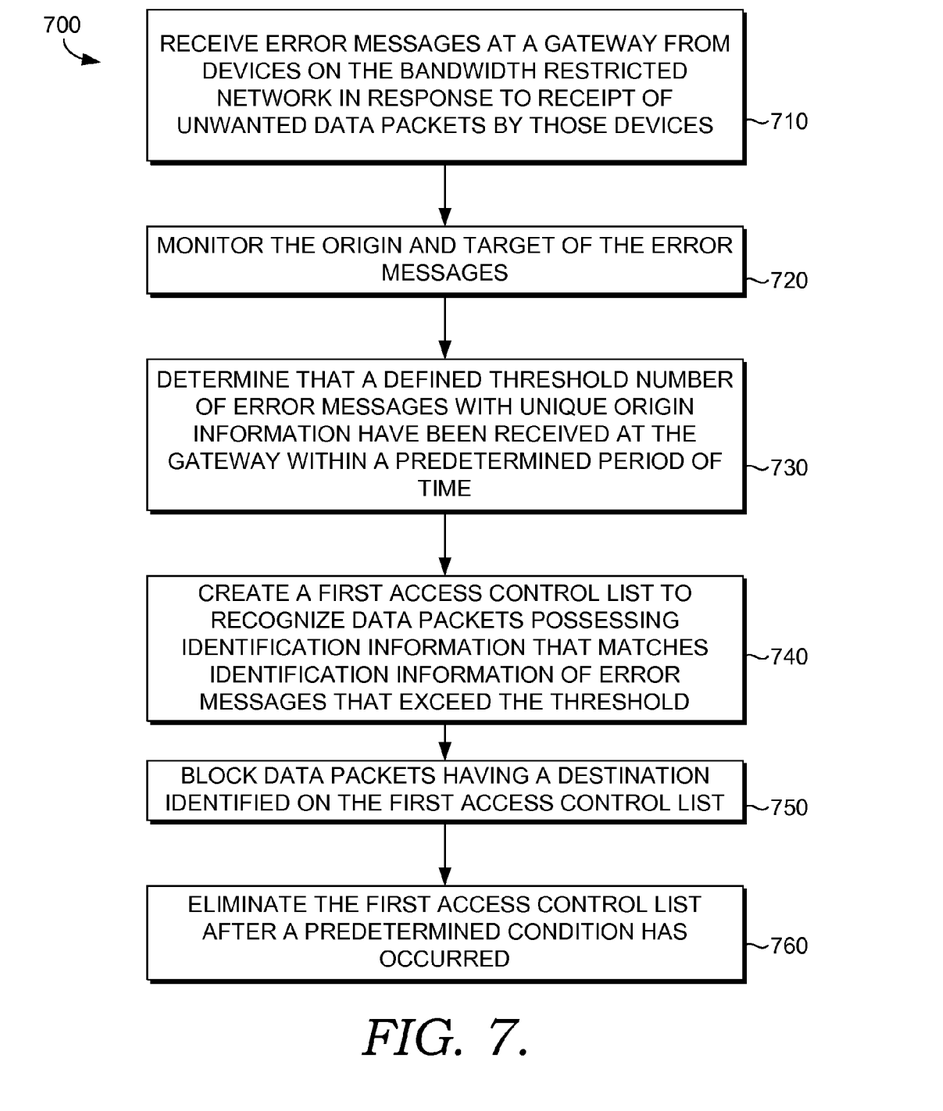
FIG. 7 illustrates a flow diagram of a method for eliminating unwanted data packets before entering a restricted bandwidth network through the use of an access control list, the access control list identifying unwanted data packets based on a unique destination of the data packets in accordance with an embodiment of the present invention.

FIG. 7 illustrates a flow diagram 700 of a method for eliminating unwanted data packets before entering a restricted bandwidth network through the use of an access control list, the access control list identifying unwanted data packets based on a unique destination of the data packets in accordance with an embodiment of the present invention. This embodiment of the invention may be used to prevent a plurality of user devices from sending a plurality of unwanted data packets to a user device on a restricted bandwidth network. In embodiments, if a sufficient number of error message are received that share the same origin but have a plurality of targets, the gateway may create an access control list that blocks all data packets directed to the device, as identified by the origin of the error messages and/or the destination of the unwanted data packets.

Initially, at block 710, error messages are received at a gateway from a plurality of devices. The error messages are sent by the plurality of devices on a restricted bandwidth network, the error messages sent in response to receipt of unwanted data packets from a second network received by the plurality of devices. Once the error messages are received at the gateway, at block 720 the origin and target of the error messages are monitored. The origin of the error messages identifies the device sending the error message in response to receiving unwanted data packets. The target of the error messages identifies the source of the unwanted data packets, e.g. a server.

Next, at block 730, the monitored error messages are tracked to determine whether the number of error messages associated with a specific target have reached a threshold number of error messages within a predetermined amount of time. If it is determined at step 730 that a threshold number of error messages has been met, a first access control list is created at block 740 to recognize data packets comprising a destination matching the origin of the error messages exceeding the threshold amount of error messages in a predetermined amount of time and, further, the data packets comprising an origin matching the target of the error messages exceeding the threshold amount or error messages in a predetermined amount of time. At block 750, data packets having a destination matching the origin of the error messages identified on the access control list are blocked. By blocking the data packets, the gateway prevents the device from receiving unwanted data packets. At block 760, the first access control list is eliminated after a predetermined condition has occurred.

Figure 8:
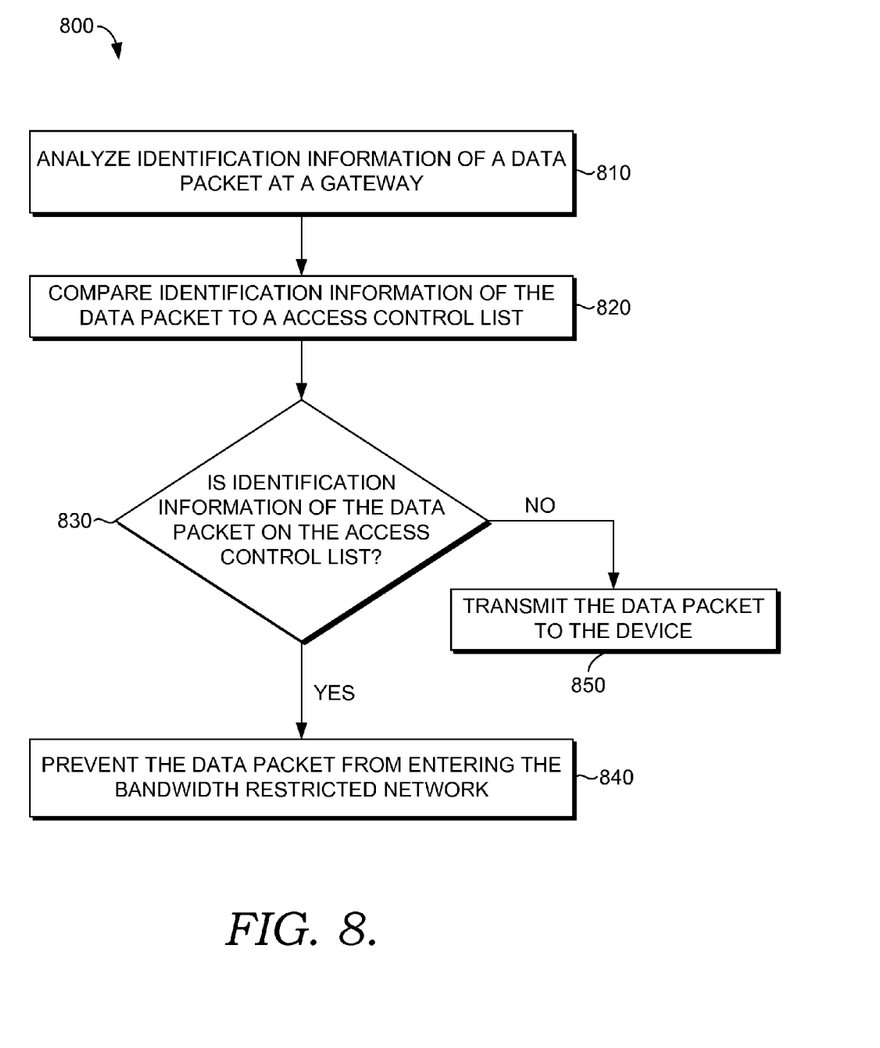
FIG. 8 illustrates a flow diagram of a method for identifying unwanted data packets at a gateway in accordance with an embodiment of the present invention.

FIG. 8 illustrates a flow diagram 800 of a method for identifying unwanted data packets at a gateway in accordance with an embodiment of the present invention. At block 810, identification information of a data packet is analyzed at a gateway. At block 820, the identification information of the data packet is compared against an access control list. The access control list may be generated according to the descriptions given above. The access control list includes identification information of at least one type of error message, with the identification information of the error message showing at least the source or destination of unwanted data packets that are to be blocked. At block 830, a determination is made as to whether the identification information of the data packet is recognized as matching the identification information of the error message as included on the access control list. If the identification information of the data packet is recognized as matching the identification of the error message, at block 840 the data packet is prevented from entering the bandwidth restricted network. If the identification information of the data packet is recognized as not matching the identification of the error message, at block 850 the data packet is transmitted to the user device.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for eliminating unwanted data packets by a restricted bandwidth network that interfaces with a second network, the unwanted data packets originating from the second network and causing error messages to be generated by recipients of the unwanted data packets in the restricted bandwidth network, the method comprising:

receiving error messages from a device on the restricted bandwidth network in response to receipt of unwanted data packets by the device from a gateway connecting the restricted bandwidth network to the second network, each error message including a destination of the unwanted data packets, a source of the unwanted data packets, an origin sending the error message as a source of the error message, and a target of the error message as a destination of the error message;

monitoring, at the gateway, the origin and the target of the error messages;

determining, that a defined threshold number of error messages with a unique origin and target combination have been received at the gateway within a predetermined amount of time, wherein said determining is based on error messages tracked at the device;

creating a first access control list comprising identification information of the error messages showing a source and a destination of one or more data packets that have met the defined threshold number within the predetermined amount of time, wherein the source of the data packets matches the target of the error messages and the destination of the data packets matches the origin of the error messages;

blocking, at the gateway, data packets having the source and the destination identified on the first access control list; and eliminating the first access control list after a predetermined condition has occurred.

2. The method of claim 1, wherein the gateway comprises at least one of a routing device or bridging device.

3. The method of claim 1, wherein the error messages comprise at least one of ICMP Type 3 messages or TCP RST messages.

4. The method of claim 1, wherein the origin of each error message comprises one of a mobile IP address, a simple IP address, or a static IP address.

5. The method of claim 1, wherein the predetermined condition comprises at least one of a IP releasing event or the expiration of a timer.

6. The method of claim 1, further comprising:

creating at least a second access control list which identifies at least a second origin and target combination;

blocking, at the gateway, data packets having a source and a destination og of the second origin and target combination on the second access control list; and eliminating the second access control list after a second predetermined condition has occurred.

7. The method of claim 6, wherein the gateway comprises at least one of a routing device or bridging device.

8. The method of claim 6, wherein the error messages comprise at least one of ICMP Type 3 messages or TCP RST messages.

9. The method of claim 6, wherein the origin of each error message comprises a mobile IP address, a simple IP address, or a static IP address.

10. The method of claim 6, wherein the second predetermined condition comprises at least one of a IP releasing event or the expiration of a timer.

11. A method for eliminating unwanted data packets by a restricted bandwidth network that interfaces with a second network, the unwanted data packets originating from the second network and causing error messages to be generated by recipients of the unwanted packets in the restricted bandwidth network, the method comprising:

receiving error messages from a device on the restricted bandwidth network in response to receipt of unwanted data packets by the device from a gateway connecting the restricted bandwidth network to the second network, each error message including a destination of the unwanted data packets, a source of the unwanted data packets, an origin sending the error message as a source of the error message, a target of the error message as a destination of the error message, and a total number of error messages sent and when said error messages were sent from the device;

monitoring, at the gateway, the origin and the target of the error messages;

determining that a defined threshold number of error messages with a unique target have been received at the gateway within a predetermined amount of time;

creating a first access control list that identifies a source of one or more data packets possessing identification information of error messages that have met the defined threshold number within the predetermined amount of time, wherein the source of the data packets match the target of the error messages;

blocking, at the gateway, data packets having the source identified on the first access control list; and eliminating the access control list after a predefined condition has occurred.

12. The method of claim 11, wherein the gateway comprises at least one of a routing device or bridging device.

13. The method of claim 11, wherein the error messages comprise at least one of ICMP Type 3 messages or TCP RST messages.

14. The method of claim 11, wherein the origin of each error message comprises a mobile IP address, a simple IP address, or a static IP address.

15. The method of claim 11, wherein the predetermined condition comprises at least one of a IP releasing event or the expiration of a timer.

16. A method for eliminating unwanted data packets by a restricted bandwidth network that interfaces with a second network, the unwanted data packets originating from the second network and causing error messages to be generated by a recipient of the unwanted packets in the restricted bandwidth network, the method comprising:

receiving error messages from a device on the restricted bandwidth network in response to receipt of unwanted data packets by the device from a gateway connecting the restricted bandwidth network to the second network, each error message including a destination of the unwanted data packets, a source of the unwanted data packets, an origin sending the error message as a source of the error message, and a target of the error message as a destination of the error message;

monitoring, at the gateway, the origin and the target of the error messages;

determining that a defined threshold number of error messages with a unique origin have been received at the gateway within a predetermined amount of time, wherein each error message, tracked at the device, comprises information on how many messages have been sent for tracking the defined threshold number of the error messages;

creating a first access control list that identifies one or more unwanted data packets possessing identification information of error messages that have met the defined threshold number within the predetermined amount of time, wherein the destination of the data packets matches the origin of the error messages;

blocking, at the gateway, data packets having the destination identified on the first access control list; and eliminating the access control list after a predefined condition has occurred.

17. The method of claim 16, wherein the gateway comprises at least one of a routing device or bridging device.

18. The method of claim 16, wherein the error messages comprise at least one of ICMP Type 3 messages or TCP RST messages.

19. The method of claim 16, wherein the origin of each error message comprises a mobile IP address, a simple IP address, or a static IP address.

20. The method of claim 16, wherein the condition comprises at least one of a IP releasing event or the expiration of a timer.

21. A computerized system for eliminating unwanted data packets received on a mobile device, the computerized system including a processor and one or more computer-storage media comprising:

a gateway device connected to a restricted bandwidth network and a second network;

an agent at the gateway device configured for:
(1) receiving error messages from a device on the restricted bandwidth network in response to receipt of unwanted data packets by the device from a gateway connecting the restricted bandwidth network to the second network, each error message including a destination of the unwanted data packets, a source of the unwanted data packets, an origin sending the error message as a source of the error message, and a target of the error message as a destination of the error message;
(2) monitoring, at the gateway, the origin and the target of the error messages;
(3) determining, that a defined threshold number of error messages with a unique origin and target combination have been received at the gateway within a predetermined amount of time, wherein said determining is based on error messages tracked at the device;
(4) creating a first access control list comprising identification information of the error messages showing a source and a destination of one or more data packets that have met the defined threshold number within the predetermined amount of time, wherein the source of the data packets matches the target of the error messages and the destination of the data packets matches the origin of the error messages;
(5) blocking, at the gateway, data packets having the source and the destination identified on the first access control list; and
(6) eliminating the first access control list after a predetermined condition has occurred.

* * * * *